United States Patent
Brandenberg et al.

(10) Patent No.: US 11,263,689 B2
(45) Date of Patent: Mar. 1, 2022

(54) WINE LABEL AFFINITY SYSTEM AND METHOD

(71) Applicant: DRINKS HOLDINGS, INC., Glendale, CA (US)

(72) Inventors: Zac Brandenberg, Los Angeles, CA (US); Barry Collier, Encino, CA (US); Josiah Gordon, Los Angeles, CA (US); Mingfeng Yang, Aliso Viejo, CA (US); Hang Chun Yu, Los Angeles, CA (US)

(73) Assignee: Drinks Holdings, Inc., Glendale, CA (US)

( * ) Notice: Subject to any disclaimer, the term of this patent is extended or adjusted under 35 U.S.C. 154(b) by 89 days.

(21) Appl. No.: 15/288,581

(22) Filed: Oct. 7, 2016

(65) Prior Publication Data
US 2017/0103447 A1    Apr. 13, 2017

Related U.S. Application Data

(60) Provisional application No. 62/238,791, filed on Oct. 8, 2015.

(51) Int. Cl.
*G06Q 30/02* (2012.01)
*G06Q 30/06* (2012.01)

(52) U.S. Cl.
CPC ..... *G06Q 30/0635* (2013.01); *G06Q 30/0255* (2013.01); *G06Q 30/0269* (2013.01); *G06Q 30/0631* (2013.01)

(58) Field of Classification Search
CPC .......... G06Q 30/0635; G06Q 30/0631; G06Q 30/0255; G06Q 30/0269
See application file for complete search history.

(56) References Cited

U.S. PATENT DOCUMENTS

| | | |
|---|---|---|
| 6,266,649 B1 | 7/2001 | Linden et al. |
| 2002/0123957 A1 | 9/2002 | Burtnotarius et al. |
| 2002/0147627 A1 | 10/2002 | Roosevelt et al. |
| 2002/0156770 A1* | 10/2002 | Krichilsky ............. G06Q 30/02 |
| 2004/0181445 A1 | 9/2004 | Kolsky et al. |
| 2006/0173872 A1 | 8/2006 | Koike et al. |
| 2009/0013053 A1* | 1/2009 | Wehner ............... G06F 16/9535 709/206 |
| 2009/0210321 A1 | 8/2009 | Rapp |
| 2010/0250336 A1* | 9/2010 | Selinger ................. G06Q 30/02 705/26.7 |

(Continued)

OTHER PUBLICATIONS

"Redesigned Wine Labels and Consumer Preferences" (Maddox, Ali; Mar. 2012—Agribusiness Department California Polytechnic State University) (Year: 2012).*

(Continued)

*Primary Examiner* — James M Detweiler
(74) *Attorney, Agent, or Firm* — Duane Morris LLP

(57) ABSTRACT

The present invention relates generally to a system and method for sorting, ranking, and presenting and/or recommending multiple products for purchase having different labels in a coherent and structured way, and more specifically a system and method to generate marketing communications which display labels and/or wine labels based on an affinity system and ranking to help consumer and buyer select and purchase wine using either a digital interface or even in the course of normal retail buying process to select appropriate product.

1 Claim, 14 Drawing Sheets

(56) References Cited

U.S. PATENT DOCUMENTS

| | | | |
|---|---|---|---|
| 2012/0226698 A1* | 9/2012 | Silvestre | G06Q 30/02 |
| | | | 707/741 |
| 2012/0278127 A1 | 11/2012 | Kirakosyan et al. | |
| 2013/0080438 A1 | 3/2013 | Tompkins | |
| 2014/0236870 A1 | 8/2014 | Dillon et al. | |
| 2014/0324624 A1* | 10/2014 | Ward | H04W 4/21 |
| | | | 705/26.7 |
| 2015/0100376 A1 | 4/2015 | Lebrecht et al. | |
| 2015/0242905 A1* | 8/2015 | Capel | G06Q 30/0269 |
| | | | 705/14.53 |
| 2015/0262282 A1* | 9/2015 | Walti | G06Q 30/0631 |
| | | | 705/26.7 |
| 2016/0284004 A1* | 9/2016 | Taylor | H04L 67/306 |

OTHER PUBLICATIONS

"Analysis of Wine Label Design Aesthetics and the Connection To Price", Molly Webster, Jun. 2010; 56 pgs.
"Message On a Bottle: Colours and Shapes in Wine Labels", Luiz de Mello and Ricardo Pires Goncalves; Universitat Autonina de Barcelona; Munich Personal RePEc Archive; May 2008; 15 pgs.
Ben Schafer J et al: "Collaborative Filtering Recommender Systems", Apr. 24, 2007 (Apr. 24, 2007), The Adaptive Web; [Lecture Notes in Computer Science;;LNCS], Springer Berlin Heidelberg, Berlin, Heidelberg, pp. 291-324, XP019057885, ISBN: 978-3-540-72078-2 [retrieved on May 16, 2007].

* cited by examiner

|  | WINE 1 | WINE 2 | WINE 3 | WINE 4 | WINE 5 |
|---|---|---|---|---|---|
| CUSTOMER A | 5 | 3 | — | 1 | — |
| CUSTOMER B | 4 | — | — | 1 | 1 |
| CUSTOMER C | 1 | 1 | — | 5 | 3 |
| CUSTOMER D | 1 | — | — | 4 | 2 |
| CUSTOMER E | — | 1 | 5 | 4 | — |

FIG. 11

|  | WINE 1 | WINE 2 | WINE 3 | WINE 4 | WINE 5 |
|---|---|---|---|---|---|
| CUSTOMER A | 5 | 3 | 2.3 | 1 | 1.2 |
| CUSTOMER B | 4 | 2.9 | 2.1 | 1 | 1 |
| CUSTOMER C | 1 | 1 | 0.3 | 5 | 3 |
| CUSTOMER D | 1 | 1.5 | 4.2 | 4 | 2 |
| CUSTOMER E | 0.8 | 1 | 5 | 4 | 2.6 |

FIG. 12

WINE LABEL AFFINITY SYSTEM AND METHOD

RELATED APPLICATION

The present utility patent application claims priority from and the benefit of U.S. Provisional Patent Application No. 62/238,791, filed Oct. 8, 2015, titled Wine Label Affinity System and Method, the contents of which are hereby incorporated by reference in their entirety.

FIELD OF THE INVENTION

The present invention relates generally to a system and method for improving the volume of sales of wine to wine buyers over the internet, namely a system and method for selecting, sorting, ranking, and presenting and/or recommending multiple different products for purchase having different labels in a coherent and structured way, and more specifically a system and method to generate marketing communications which display labels and/or wine labels based on an affinity system and ranking to help consumer and buyer select and purchase wine using either a digital interface or even in the course of normal retail buying process to select appropriate products.

BACKGROUND OF THE INVENTION

Marketing in each field differs greatly. Cars are not sold like t-shirts and to improve sales performances, unique methods and systems must be put in place for each field of industry. The notion that methods used in one industry apply to a different industry are false. For example, the notion that fragrances can be used to enhance the sale of new cars simply does not apply in the world of apparels. The mere concepts that a unique smell can somehow promote sales does not extrapolate to other fields without a justification as to why this is possible. The notion that a fruit seller could simply extrapolate the use of fragrances to promote sales is not obvious or even intuitive. Since sales are as old as mankind, tools which improve sales, if they are obvious would already be in use. The notion that any new technology arrives on the market is strong evidence of its non-obviousness.

Systems and methods which results in improved sales outputs (i.e. greater sales for the same effort) are useful and desired. In the field of wine, sales require ambiance, the right atmosphere, the right food pairing, and even the right company to fully change behavior. Further, some wine improve with age and will be purchased at a time when they have not reached their peak taste. To help guide consumers in the purchase of wine, several systems and methods exist. Experts and wine connoisseurs may rank and give opinions about wines which make their way into catalogs and grading systems. Like movie goers trust their favorite critics, some buyers will then flock to advice from their known and recognized expert. One important drawback from such a system is the inherent bias of experts and the complexity of having to search and index a wine each time one is purchased. For example, when standing in front of a large wine display or when surfing to a webpage with hundreds of wine labels, a user simply does not have the bandwidth to use this system and method to select a wine.

A second known system is the use of locations of trust. Some stores and their owners (or some websites and their web-operators) will rank and sort wines of certain types. Once a user associates his/her preferences with the location, simply by pushing the physical or virtual door, the person will know a preselection has been done. Some wine stores or restaurants have on staff sommeliers to guide those buying or selecting wine. Once again, these systems all have their imperfections. For example, they assume a buyer will systematically go to this location and that he/she will not like the process of discovering or finding new products by themselves.

One recent method and system is linked with a wine-club membership. Some retailers and sellers offer promotional wine, box different wines, and offer some type of structuring around bulk or periodic purchases. Once again, while these system do present some advantages to some buyers, most do not enjoy leaving the decision to buy and select to third parties. Furthermore, these wine clubs require constant involvement and interest or there may be abuse of process.

In the world of wine, there are many techniques and systems used by the industry to market or recommend a bottle of wine to an individual. The techniques include wine ratings from noted experts that target the general consumer population, and more advanced techniques using statistical methods to individualize a recommendation based on the specific consumer's taste preferences or profile. These approaches are utilized and delivered via various mediums, including websites, mobile apps, and general marketing materials.

While these techniques can generally be more effective than just random selection, they all rely on the consumer's palate as the principal component for the recommendation. This approach fails to address many key issues when it comes to how and why a typical consumer selects and enjoys a bottle of wine.

In the case of wine expert ratings, there are studies that show that there can actually be a negative correlation between wine expert ratings and general consumer taste preferences, which underlies the fact that the taste of wine is at best very subjective. Even among many wine experts, there can be high variances in ratings for the same wine. This nuance and subjectivity with respect to the taste of wine has led to the development of a number of more advanced approaches for individualizing wine recommendations. These approaches generally start by using various techniques to classify wines based on certain taste descriptors, e.g. tannins, acidity, fruit, etc. The methods used to classify the taste descriptors can range from using an expert panel to designate the intensity levels of each taste descriptor, to using advanced machinery for detailed chemical analysis. A consumer taste profile is then generated using various explicit and implicit feedback techniques.

Once the consumer taste profiles are generated, the system will use various statistical methods to rank and recommend wines based on their similarity to the consumer's taste profile. While this method is more likely to be effective than generic wine expert ratings or crowdsourcing, the technique still does not address what drives a consumer to purchase a bottle of wine, especially one which they cannot actually taste prior to purchase.

In a well noted study done in 2001 by researcher Frédéric Brochet, 54 wine experts were invited to review and compare two glasses of wine. The first glass contained a white wine, and the second glass had an identical white wine with red food coloring to make it appear as if it were a red wine. None of the wine experts identified the food colored glass of wine as a white wine, and they used words to describe the white wine that are generally reserved for red wines, such as "jammy" and "crushed red fruit."

In that same study, the author conducted a second experiment in which 57 wine tasters were given two glasses of Bordeaux one week apart from each other, but under two different labels. For the first pouring, the bottle was very clearly labeled as VDT (basic table wine), while the second bottle was labeled as a prestigious GCC wine (Grand Cru Classé). Both bottles in fact contained the same average Bordeaux. Although the wine experts were tasting the very same wine, the language they used to describe the two wines varied greatly, simply due to the label on the bottle. The wine from the prestigiously labeled bottle was called complex and balanced, while the bottle with the table wine label was called simple and unbalanced.

Brochet attributes this phenomenon to "perceptive expectation," i.e. the tasters perceived what they preperceived. It is precisely the utilization of "perceptive expectation" that is missing when it comes to wine recommendation systems. When a consumer is presented with a wall of wine, whether in a retail environment or in an online store, they consciously apply basic "prefilters" to limit their selection to a more manageable set of options, e.g. price range, red or white wine, merlot or cabernet.

From there, consumers subconsciously use a variety of visual cues to help choose their wines, which include descriptions of the wine's taste, the style of the label, etc. It is these visual cues on the bottle that subconsciously affect how the consumer perceives the wine will taste, and how it will make them feel. Therefore, these visual cues actually play an important role for wine consumers, not only in whether they choose a wine from a larger selection of available wines, but also whether they will actually enjoy the wine. Accordingly, there is a need for a method and system for providing wine recommendations based on factors that include visual attributes of the wine packaging The current technology relies on multiple fields of research and analysis. For example, Marcia Roosevelt filed in 2001 U.S. patent application Ser. No. 09/782,864, directed to a method of developing a conceptual design for a product or service which involves defining a conceptual design goal and parameter and then creating a project team representing several diverse types of intelligences. What was shown is that visual help can be used to reinforce selection models. Several years later, Mister James D. Kolsky filed U.S. patent application Ser. No. 10/389,348 directed to a method and apparatus for managing product planning and marketing. This tool, in the field of wine, was designed to describe how using segments of consumers and statistical evaluation of linking indications, some wines can be grouped and thus can be linked to improve consumer association. The problem with these solutions is the need for intense understanding of statistical information, and a deep knowledge of the consumer making a decision. In most cases, consumers simply do not know their own flavor profiles or tastes and cannot give the system any information.

Other methods to classify wine also rely intensively on the characterization of wine and not labeling. For example, inventor Alyssa J. Rapp, in 2009, filed U.S. patent application Ser. No. 12/366,918, titled method and system for classifying and recommending wine. In this system, a database is used where wine is inventoried. The information uploaded for each wine includes a set of attributes, a taxonomic category, a numeric bin value, and then somehow uploading a numeric personal taste profile of a user to help select the wine. Once again, this system is burdensome, data intensive and assumes a user knows its own personal taste profile or that a user has enough wine selection information or patience to populate forms to help determine the profile. Two years later, inventor Michael J. Tompkins filed U.S. patent application Ser. No. 13/627,738 titled systems and methods for wine ranking. The same way, user preferences and intensity values are used to help populate a database filled with descriptors and intensity values linked with each wine. These methods rely on a user's deep understanding of wine, a capacity to relay this information into a system which will help him select.

Once in a while, brilliant inventors will have skills and understanding from other unrelated fields which they find of relevance and that can be imported into a different field to help create a new invention. In this case, neuro-science can be used as is described in part in the invention of Sophie Lebrecht, as U.S. patent application Ser. No. 14/382,406 titled method and system for using neuroscience to predict consumer preference. In this case, images can be presented to an individual in patterns and the calculation of a valence value linked with a paradigm can be designed as a stimuli to enhance experiences. This technology, while distant from the wine making industry is relied in part as part of the background of this wholly new and creative technology.

In 2010, Gergely Szolnoki et al. published Origin, Grape Variety or Packaging? Analyzing the Buying Decision for Wine with a Conjoint Experiment. This research from the American Association of Wine Economist (Working Paper No. 72), looked to see what portion of wine branding was instrumental in wine making decisions from different groups such as younger consumers, older wine connoisseurs, or even main stream clients, and it was concluded that label style, like bottle color, bottle form, and identification of the wine was instrumental in a 10% percent of the buying decisions. In fact, for a main stream population, the primary vector of purchase was the label style. This report concluded that in up to 70.1% of purchase decisions, the bottle form, the color and the label had the greatest influence in buying and in 39.5% of the time, the label was the primary factor across all purchasing segments.

Finally, California Polytechnic State University student Molly Webster, in June 2010, published in partial fulfillment of the requirements for the degree of Bachelor of Science a piece titled, Analysis of Wine Label Design Aesthetics and the Connection to Price. This person analyzed the price of wine, the score ranked by Mr. Parker, and tried to compare some label design features. While she was unable to overly conclude as to anything but one single variable like artistic and design theories, she concluded: "While the artistic and design variables of a wine label may persuade a consumer, they do not affect how a wine is originally priced by the manufacturer." The current invention is designed to prove this scientist wrong and use labels to help generate price differences and influence purchasing behaviors.

BRIEF SUMMARY OF THE INVENTION

One aspect of the present invention meets the above described need by providing a method and system to rank and recommend wine to consumers based on visual attributes of the wine packaging and how the visual attributes correlate to a consumer's visual preference profile. The method comprises describing wines by visual attribute descriptors, with each descriptor having a predetermined intensity value, storing the descriptors and their intensity values within a wine profile database, generating a consumer preference profile that includes at least one of the wine descriptors and the consumer preference intensity value, and ranking the wines by correlating the descriptor intensity values.

BRIEF DESCRIPTION OF THE DRAWINGS

FIG. 11 is a matrix showing the total number of times a particular customer has purchased a bottle of wine.

FIG. 12 is a matrix with the missing values from FIG. 11 completed by means of a matrix factorization or maximum likelihood method

DESCRIPTION OF THE PREFERRED EMBODIMENTS

Figure 1:
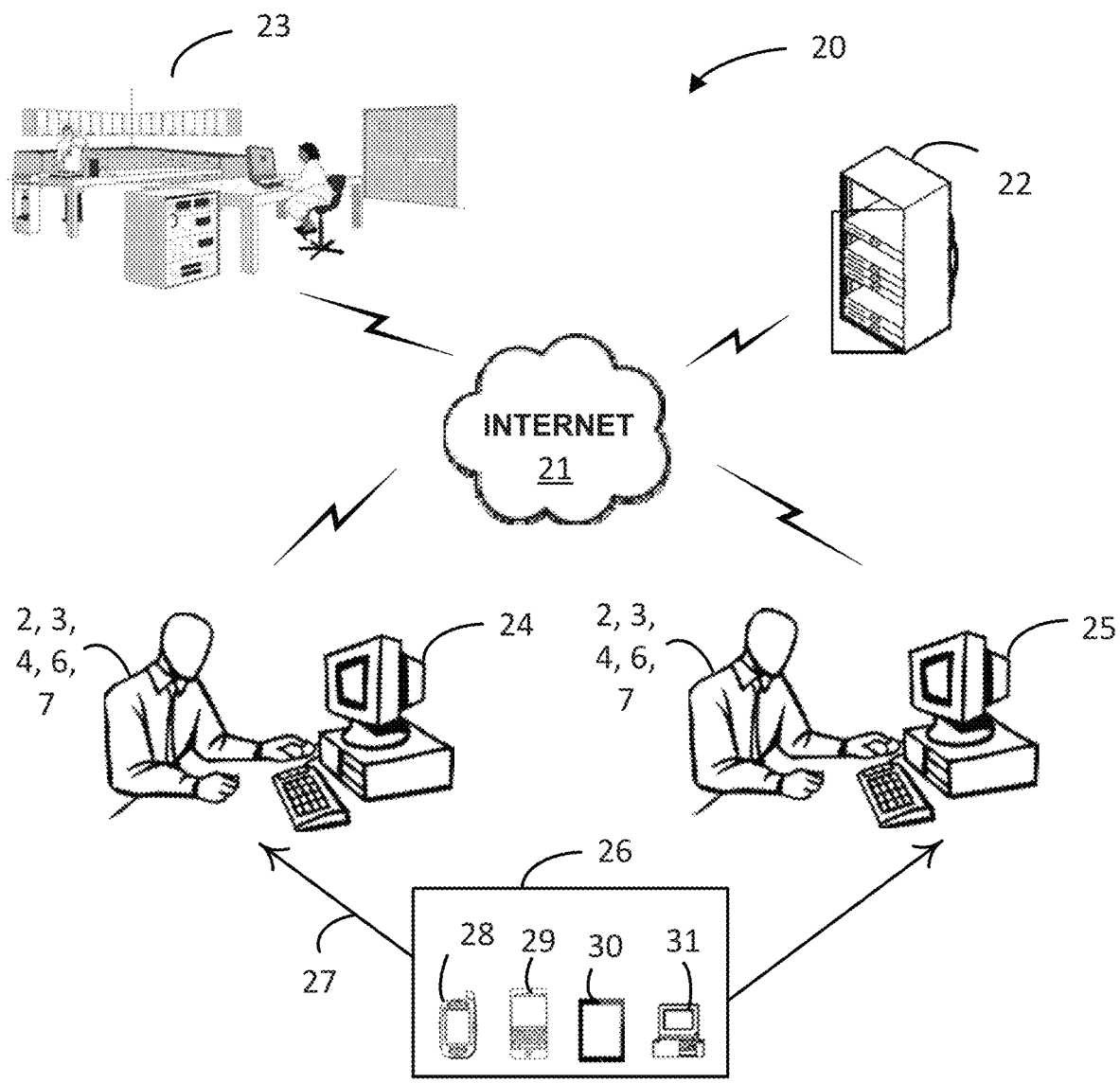
FIG. 1 is a schematic illustration of possible hardware used in a network configuration.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Recent shifts in law of patents force the patent office to wonder if any new invention is nothing more than an abstract idea without much novelty over what exists in the market. In turn, this forces inventors to clearly articulate the field of invention, the abstract notion behind the invention, and to explain clearly why the new invention is not abstract and/or is a substantial new step over what is known. The current technology relates generally to the use of visual pairing of wine label association to help promote the sale of wine via marketing information. The notion that items for sale must be arranged on a shelf is not new, this is the abstract idea at the heart of this technology. Two places are known to organize goods being sold to consumers, either at the point of sale or in a marketing brochure. At a point of sale, tools used include the placement of tags, papers, promotions, or displays to promote the sale of products. Store owners do not ask clients questions about their preferred visual cues (i.e. do you like animals), then place on a shelf similar bottles of wine on which animal pictures can be seen. Marketers who print and distribute via paper or the internet weekly promotional materials will group the products based on multiple factors such as price rebates, price differences, and use graphic stars, circles, or other visual cues outside the product to sell. No one has ever crawled data from sales or customers to help organize labels of products to enhance sales. All wine stores display the products based on a country of origin (e.g. France, Italy) or a region (e.g. Napa, Lodi), or even the color of the wine or based on price ranges. No store has ever ranked wines based on an algorithm as shown below. This invention, as described is shown as embodied on the internet or another new communication network. While one such embodiment is described, what is claimed is the use of any type of marketing and sales associated with these products which result in the same novel improvement of sales.

Client-Server Technology involves a cooperative data processing between servers and clients, whereby servers provide data processing services to targeted clients through a network consisting of multiple pieces of hardware.

FIG. 1 is a schematic illustration of possible hardware used in a network configuration. Back in 1990s, when the Internet was made available to the public, few were familiar with the general interconnectivity of the hardware elements used in any platform or system 1. To enable patent applications, much description of the interconnectivity of these elements became necessary. With time, those of ordinary skill in the art realized how each of these elements and pieces, either in hardware and/or software, operate. To help with this disclosure, what is described hereafter is one configuration of how different elements can operate in tandem.

FIG. 1 shows at the center 21 how the Internet can be used as the protocol of communication using, for example, the HTML protocol. Other networks are also contemplated; for example, wireless networks, internal networks, or other non-HTML networks. As the current platform is expanded and new technology arrives, one of ordinary skill will know that the concepts shown herein can be applied to other networks, and to new technology as currently used over the Internet and wireless networks.

Shown is a remote data server 22, used sometimes to store data used by any software application. For example, in recent years Cloud technology allows for more fluid data management by relying on a network of servers 22 located in different physical locations around the world. As shown, different rooms 23 are connected to the Internet to help manage the system, offer users rights and manage the flow of data. As shown, different pieces of electronics 24 and 25 are in turn connected to the Internet 21 using their own communication protocols to help large numbers of users get access. As shown, the users may be individuals 2, 3, 4, 6, or 7, as shown at FIG. 1. To help the reader understand, while the illustration shows desktop computers 24 and 25, over time users have become more familiar with less bulky systems and equipment capable of also accessing the Internet 21. For example, today's wireless phones now offer owners almost full surfing capabilities through browsers and double capacity transceivers. As shown, users 2, 3, 4, 6, and 7 can use a desktop 31, a tablet 30, a smart phone 29 or a simple cell phone 28. In each case, the users 2, 3, 4, 6 and 7 simply connect 27 the device 26 using access and password features on a software layer. What is not described but is known is how the different ports and communication protocols interconnect using normal connectivity technology. For example, modern tablets can connect through wireless connection, data connection over phone networks, by using Bluetooth®, or by any other data transfer standard.

Figure 2:
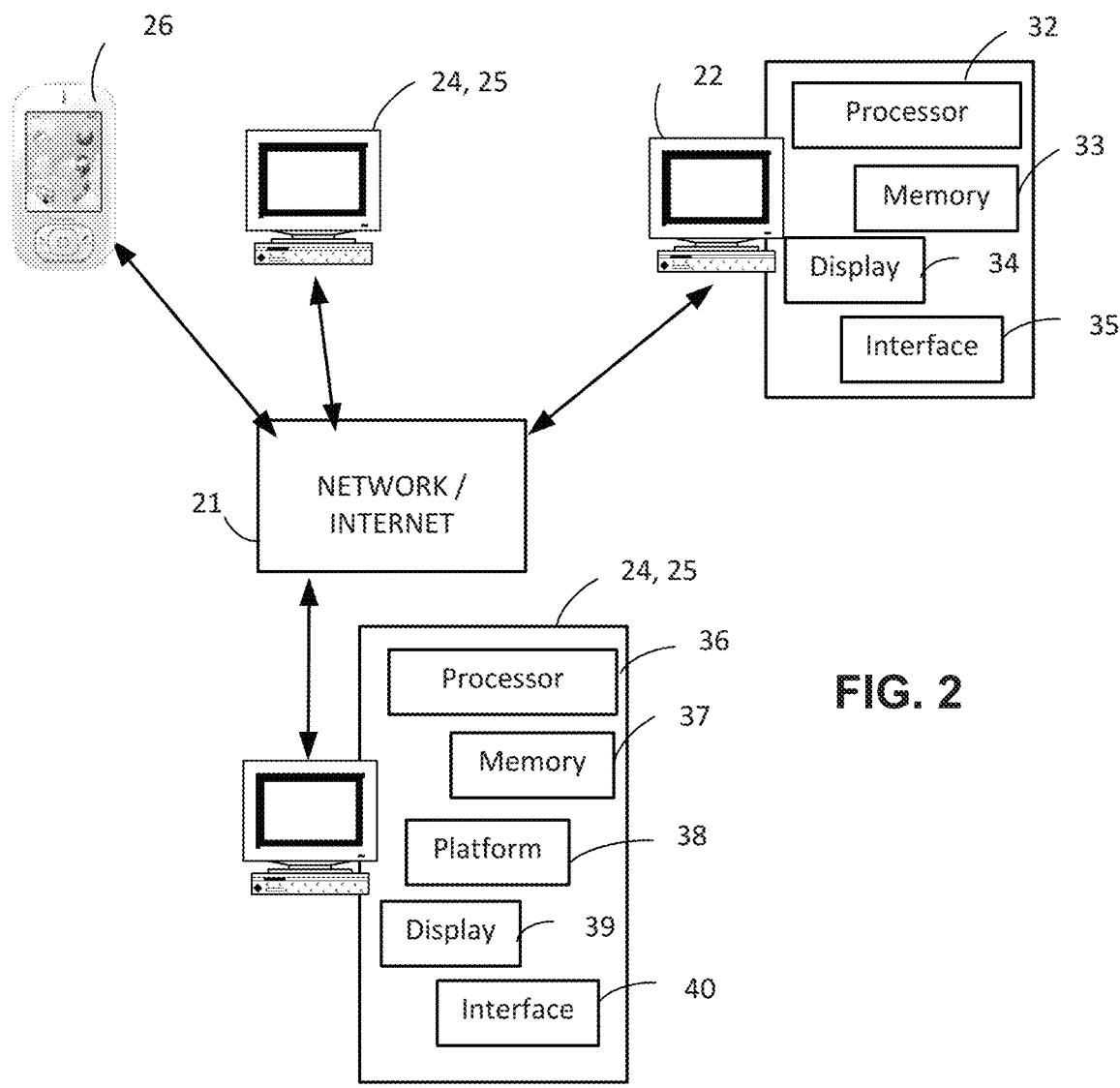
FIG. 2 is a schematic illustration of the different internal hardware layers needed to process information by the different hardware elements shown at FIG. 1, according to an embodiment of the present invention.

Now that the general structure of users has been explained and the overall network configuration of hardware 20 as shown at FIG. 1 is accessed by different users, we will next explain how each of the devices 26 can host and empower multiple types of software to operate within these devices alongside (when needed) phone communication. FIG. 2 is a high-level schematic of the different internal hardware layers to process information by the different hardware elements shown at FIG. 1, according to an embodiment of the present invention.

Illustrated here are the different elements 22, 24, 25, and 26 connected to the network 21. What is illustrated is how each of these devices has at least one processor 32, 36 which requires memory 33, 36 to operate. On the memory is written software instructions, and each of the devices relies on multiple layers of hardware technology which operates to empower ports, clocks, and other key features including providing the capacity to run programs in memory and then execute the program in a way which can result in output to be processed by the system. These devices also generally have a display 34, 39 of one type or another to interact with the user, and also have an interface 35, 40 of one type or another such as a keyboard or a mouse, to help exchange information with the user. As shown, the platform 38 or executed software used in the current invention is shown on the device 24, 25. This is designed to illustrate generally software applications executing on the device 24, 25 for one or multiple uses. While this description is broad and general, at the current moment in time it is sufficient to empower one of ordinary skill to understand how the below-described system will be implemented without undue experimentation and testing.

Recently, with the expansion of connectivity to handheld portable devices, software which once was confined to desktops or servers now has migrated to these devices. A remote store on a server houses multiple "apps" (i.e., an executable file in .app format) which can be uploaded directly by a user into the memory of a portable device for execution. Most of these apps then connect via wireless technology to a remote server where the main software application resides and operates. These apps often serve as satellite software capable of interacting with a remote base for multiple functions. Since this technology has greatly expanded in the last decade, FIG. 2 is a schematic representation of how software, such as app-based software, can be used over a series of network servers to help enhance the software layer of the different hardware elements shown at FIG. 1, according to an embodiment of the present disclosure. As for the above-suggested embodiments, this one is simply illustrative and not designed to limit the platform in any way.

Figure 3:
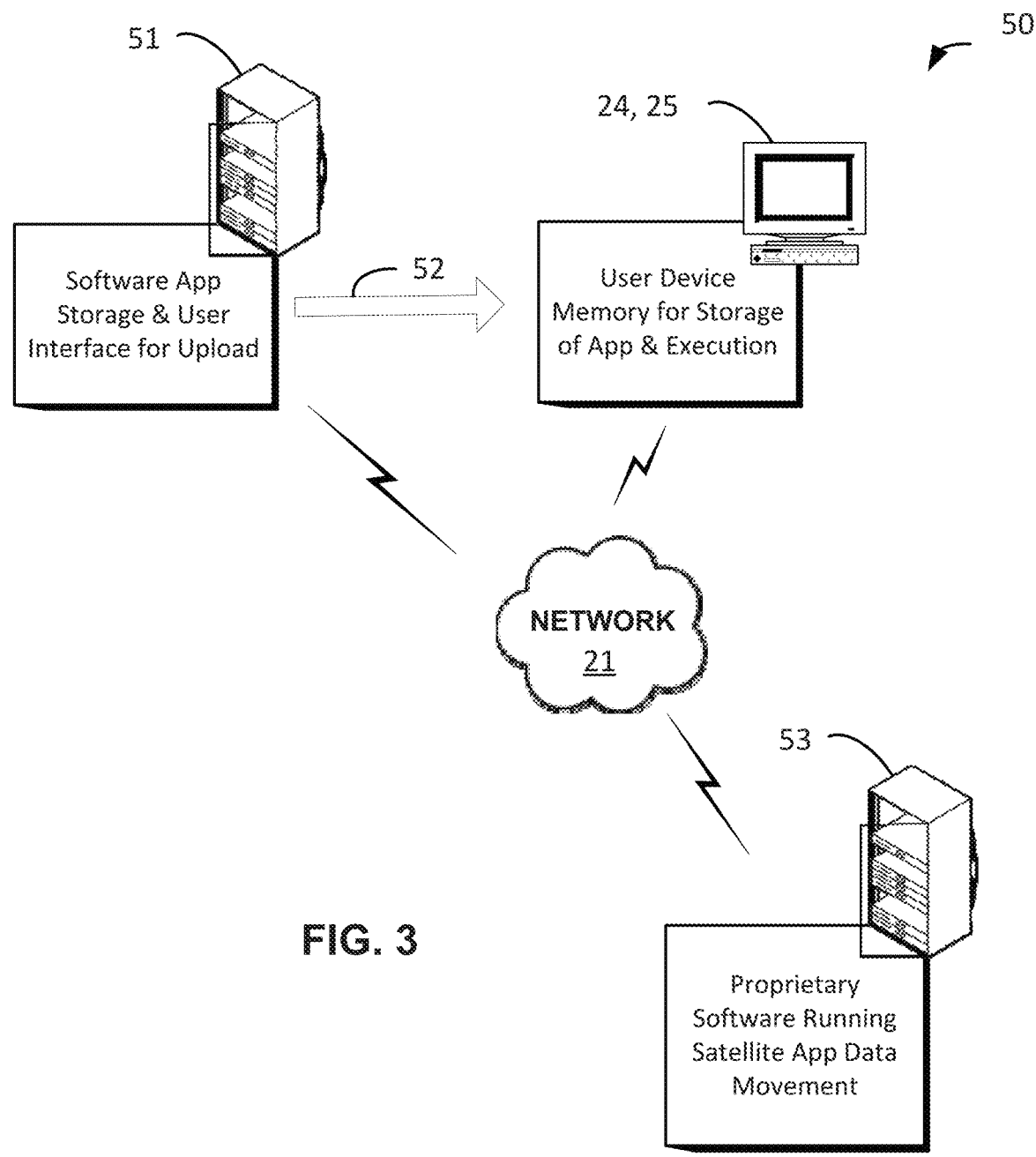
FIG. 3 is a schematic representation of how software, such as an app-based software, can be used over a series of network servers to help enhance the software layer of the different hardware elements shown at FIG. 2 for use with a platform as shown at FIG. 1, according to an embodiment of the present invention.

Apps, once they are programmed, are uploaded using an online portal onto a service provider; for example, the App Store® from Apple®. This is shown at FIG. 3 as server 51. Users will then access the server 51 via the network 21 and, using their own devices, upload the app 52 required from the server 51. Once added to the memory of the device 24, 25, it will be executed and an icon-based interface will help a user launch the app locally. Using the network 21, once the App is launched, it will reach out to a second remote server 53 where data stored on the main software executes and is in contact with other parts of the system. Since this technology is rather new, it is expected this process of sharing and managing apps locally and remotely will evolve with time.

Currently, many software programs use a local HTML browser installed on the computer, along with their associated displays and interfaces, for example tablets, cell phones, portable or fixed computers with a commercial browser tool such as Internet Explorer®, or Mozilla Firefox® to exchange information for the most part in the form of HTML script and data linked with the HTML script and display based on the format of the browser. The platform software 8, while programmed in any of multiple programming languages, relies on any one of multiple database tools, and can be made to read and generate content that can be accessed by the remote HTML browsers.

The Core Concept/Technology Linked to Labels

Packaging and labeling are known as printed surfaces, generally of paper, which include branding, logos, designs, colors, and other information which allows products to be sold in commerce. When two brands, labels, or designs become confusingly similar, they will create confusion in the mind of consumers and trademark laws will help owners enforce their respective marks. This allows the inventor to assume that different labels can be distinguished without confusion by consumers using one of multiple elements listed above.

The various wine packaging descriptors, e.g. characteristics of the label, bottle, stopper type, etc. may be classified for each bottle of wine. People recognize multiple features or descriptors linked with each different label/product to be sold. Depending on the descriptor, classifications can be represented by a binary value (e.g. 0 or 1 also often called normalized values in a range of 0 to 1), categorical values (e.g. colors), or as an ordinal value which represents an intensity scale with a predefined range (e.g. 0 to 10 or 0 to 100 under the Parker™ Scale) as shown in the table below:

| Descriptor | Explanation | Type | Example |
| --- | --- | --- | --- |
| Animal | if a label contains an | binary | 0 |
| Family Crest | it a label contains a | binary | 1 |
| Primary color | the primary color of | categorical | red |

-continued

| Descriptor | Explanation | Type | Example |
|---|---|---|---|
| Secondary color Authentic | the secondary color the overall feeling of whether a bottle feels | categorical ordinal | black 6/10 |

This table shows how descriptors are different things, and where a type of classification (e.g. binary, categorical, or ordinal) can be used. While a handful of types are shown, one of ordinary skill in the art will recognize that others can be contemplated. As is contemplated, for the moment, some or all of the actual process of classification for each bottle/label will be done manually by a person trained to identify and quantify intensity scores for the various descriptors, some classification may also be accomplished using automated processes, e.g. the use of automated image recognition software or other analytical devices. For example, with the arrival and expansion in a cell phone of eye recognition software, the accuracy and capacity to quantify these types will be improved over time. For example, the same way a code bar or other codes are read with a manual reader, the same technology can be used to scan in a new label for characterization.

While the following is not a fully comprehensive list, an example of wine packaging descriptors are: screw cap, cork, wax, primary colors, secondary colors, bright colors, dark colors, bold colors, soft colors, classic, contemporary, elegant, new age, realistic, abstract, castle, vineyard, traditional, bold, authentic, quirky, astrology, mythical, family crests, logos, printed name, plain capsule, logo capsule, black capsule, animals, people, picture, artwork, Bordeaux bottle, and golden ratio.

Once these different descriptors are quantified and linked with any given label, there may be a multi-field entry into a large database for each product. As a result an entry in the database recording the wine attributes is shown in the following table consisting of traditional descriptors like country, region, etc., and the packaging descriptors described above.

For example, in a database a wine can be described as:

| Product | Country | Region | Appellation | Varietal | Cap | Primary color | Animal |
|---|---|---|---|---|---|---|---|
| 25613 | USA | Napa Valley | Howell Mountain | Cabernet | Cork | Black | 1 |

Next to it, a consumer profile may be comprised of various behavioral, demographic, psychographic, and geographic data. This data will be represented by a combination of binary, categorical, and continuous values. The data collection process includes using explicitly and implicitly derived customer data from both first and third party sources.

In some scenarios, previously known consumers will have generated explicit and implicit feedback. For example, as consumers view, select, review, purchase, and otherwise interact with wines, the activity may be recorded and associated with that consumer. In other scenarios, a new consumer will not have generated any explicit or implicit feedback. In those cases, additional third party data may also be available and used to supplement and/or generate the consumer profile. While the following list is not a fully comprehensive list, an example of consumer profile attributes are: age, gender, occupation, income, referrer, geolocation, device (browser/OS), product views, clickstream activity, purchase history, email activity, ratings, survey responses, personality type, activities, interests, and opinions. A consumer preference profile may contain the various wine packaging descriptors along with any consumer preference intensity values, and can be obtained in at least two ways.

In some scenarios, an existing consumer will have generated enough explicit and implicit feedback to calculate his/her preference. For example, as existing customers view, select, review, purchase and otherwise interact with wines, the activity is recorded, and their preference can be deduced directly from such activities.

In other scenarios, a new consumer has not generated enough activities to calculate his/her preference. In those cases, this particular consumer is matched to other consumers in the database, and then his/her preference is estimated based on similar consumers. The similarity may be based on a combination of any available consumer profile and consumer behavior data. While the following list is not a fully comprehensive list, examples of possibly known consumer profile data for new consumers are: age, gender, geolocation, device (browser/operating system), income, etc.

Figure 13:
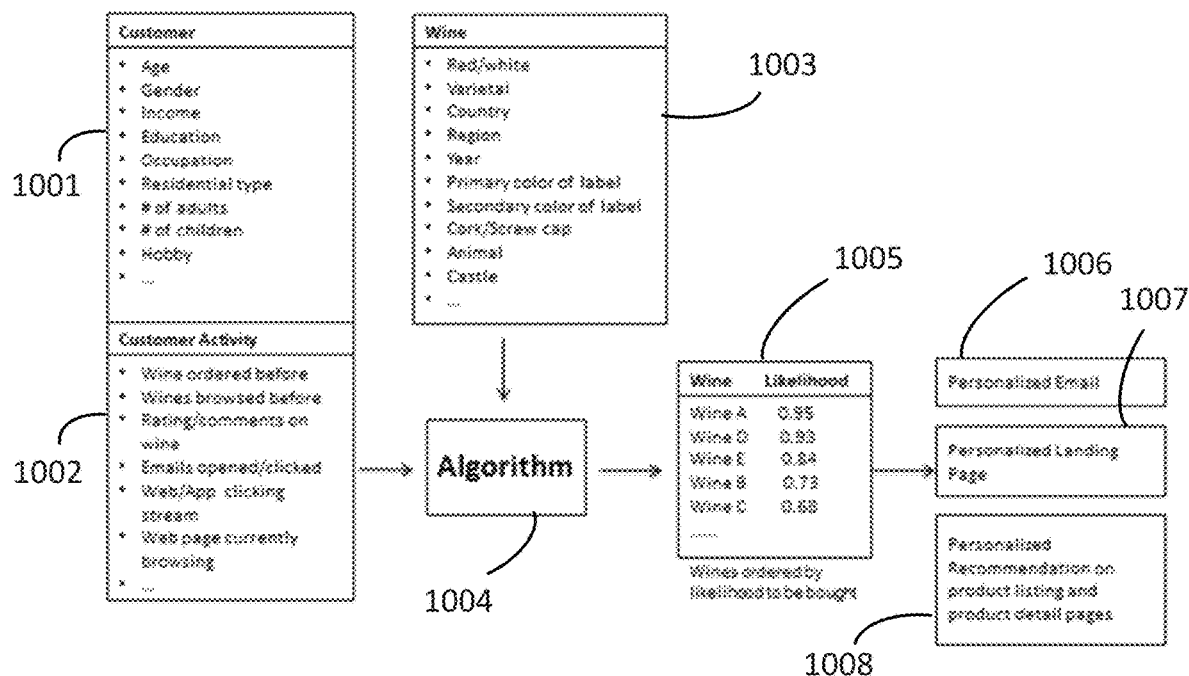
FIG. 13 illustrates the different entry data for the database according to an embodiment of the present disclosure.

FIG. 13 shows how system can also input 1001, 1002, and 1003, via cookies or other tools information about a user which allows the system to know his/her preference. For example, the system distinguishes between customer information 1001 which can include age, gender, income, education, occupation, residential type, number of adults, number of children, hobbies, etc. This information can be directly secured or indirectly secured via indirect correlation analysis. For example, a user having purchased dog food or surfed a website selling dog collars may be associated with the value of 1 when the number of household pets are determined. Next the system will look at customer activity 1002 as shown at FIG. 13. Information relating to past orders of wine, wine browsed, rating/comments read or entered as to wine, different clicks or streaming, and web page currently being browsed. A customer can receive a gift of an expensive bottle. Surfing online, he/she will enter the name of the blend, the year, and even more precise information as the bottle is held in hand. That information can be used to associate preferences but if the user does not click, the information can be changed in category and the determination that the user only wants pricing can be entered into the database.

Finally, as shown at FIG. 13, information directly related to a wine can also be entered. For example the color, the varietal, the country, the region, the year, the primary color of label, the secondary color of label, the type of closing mechanism, the notion that a label has certain distinctive features, for example an animal, a castle, etc. In one contemplated embodiment, information is secured in multiple ways relating to a user.

Figure 14:
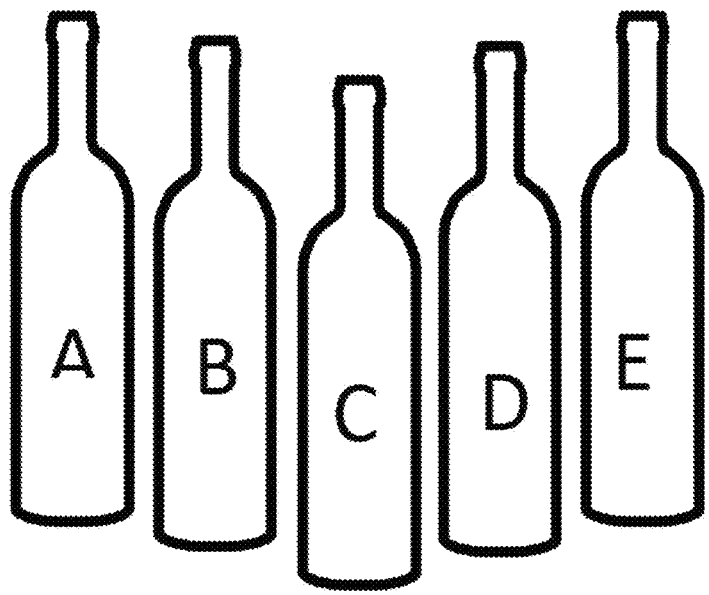
FIG. 14 illustrate a series of computer generated labels placed in a configuration designed to optimized sales according to an embodiment of the present disclosure.
Figure 15:
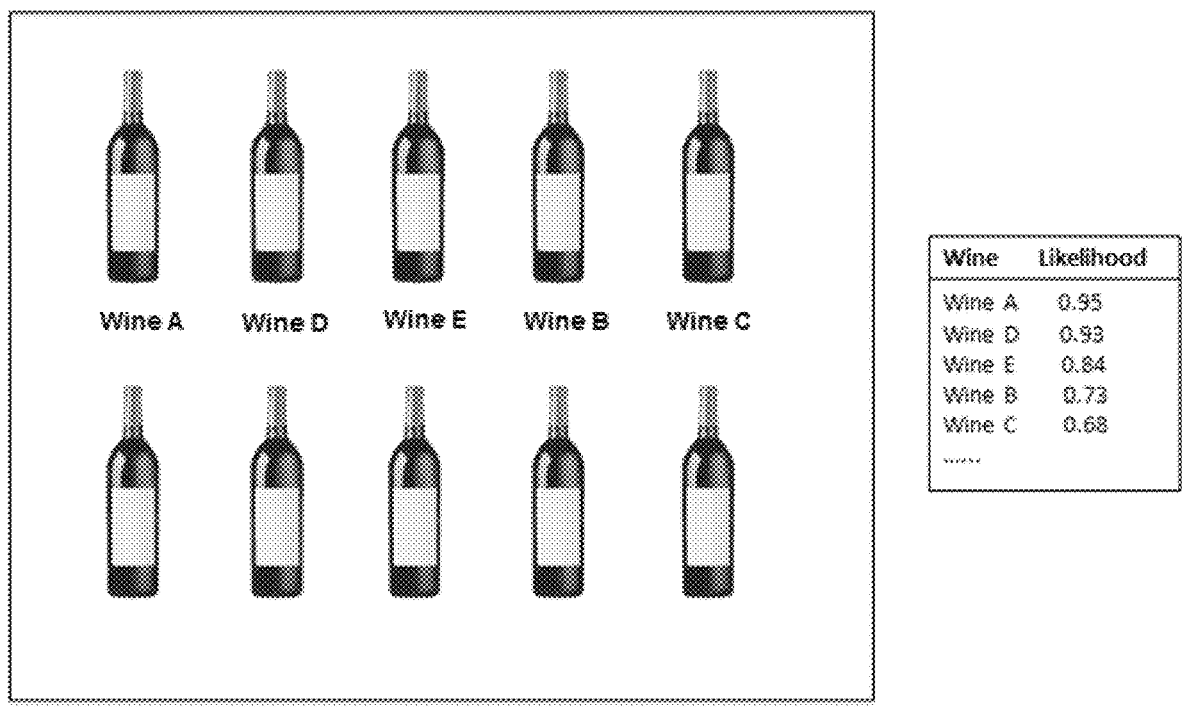
FIG. 15 illustrate a webpage where bottles are ranked based on a selected likelihood parameter according to an embodiment of the present disclosure.

FIG. 13 shows the algorithm 1004 using user data 1001, 1002, and 1003 will create a variable (as illustrated between 0 and 1) based ranking of multiple wines 1005. A personalized email message 1006 or a webpage in html format 1007 can then be generated using that information as shown in FIG. 13. In addition, based on the same information, a personalized recommendation product listing page 1008 can also be generated. In FIG. 14, different bottles illustrated from A to E, are shown, as they would normally be without the current invention. In this context, five bottles with different labels are simply shown. The favorite as shown in FIG. 13 (the one with the highest likelihood i.e. A) is displayed on the left. In this illustration, bottle C is the one most prominently displayed. If the most liked label is shown in the middle, as explained above, because of the structuring of the information in a 3D environment, the bottle in the middle will be featured in a more enjoyable way and thus be more likely to be purchased. FIG. 15 shows for example a wine ranking based on the preferences where the most liked wines are ranted on the top row from left to right. In the example shown at FIG. 14, the wines would be displayed using A in the middle, flanked by D and E and with B and C at the end. Irrespective of the display model, what is contemplated and claimed is the notion that by ranking labels based on certain features, a buyer's experience can be enhanced and sales can be increased.

Figure 4:
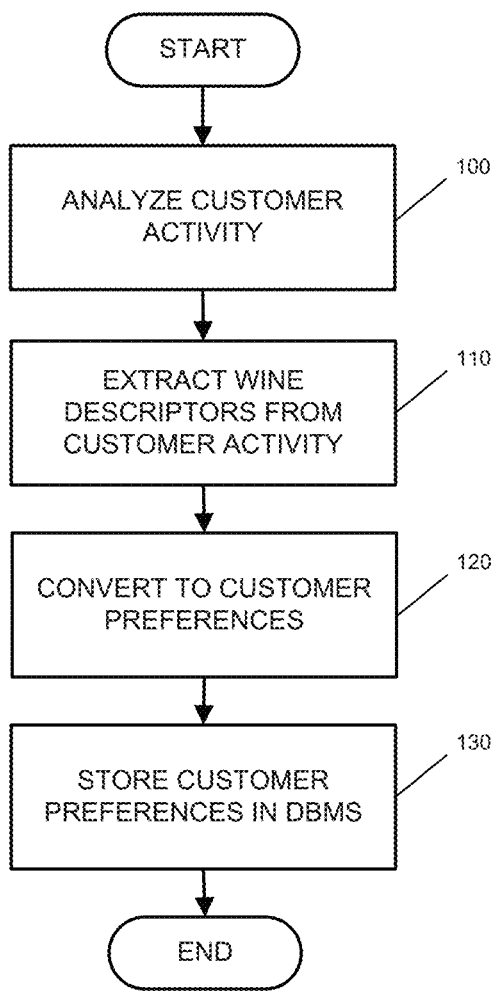
FIG. 4 is a block diagram showing the steps for preference profile training for existing customers.

Turning to FIG. 4, preference profile training for existing customers includes analyzing customer activity in step 100. In step 110, wine descriptors are extracted from the customer activity. In step 120, the wine descriptors are converted to customer preferences. In step 130, the customer preferences are stored in a database management system shown with greater detail at FIGS. 1 to 3.

Figure 5:
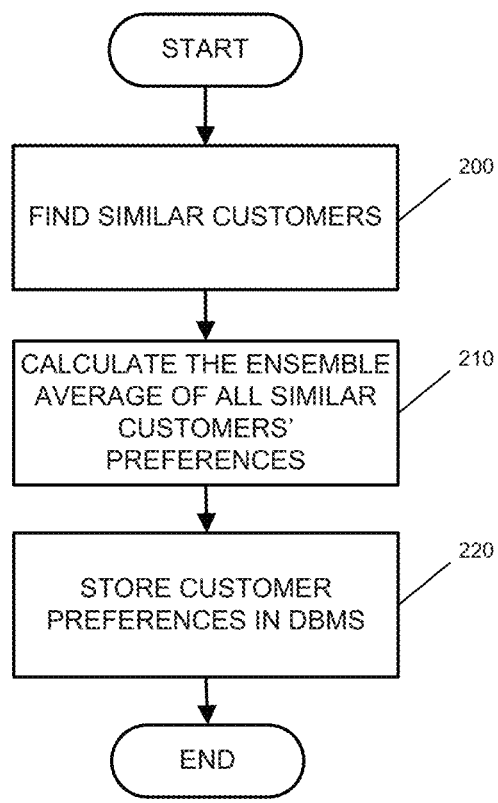
FIG. 5 is a block diagram showing the steps for preference profile training for new customers.

In FIG. 5, preference profile training for new customers includes finding similar customers in step 200. In step 210, an ensemble average of all similar customer preferences is calculated. In step 220, the customer preferences are stored in a database management system. It is possible for the two methods described above to generate a different set of descriptors, and for the sets to be combined to obtain a complete set of preference values.

Figure 6:
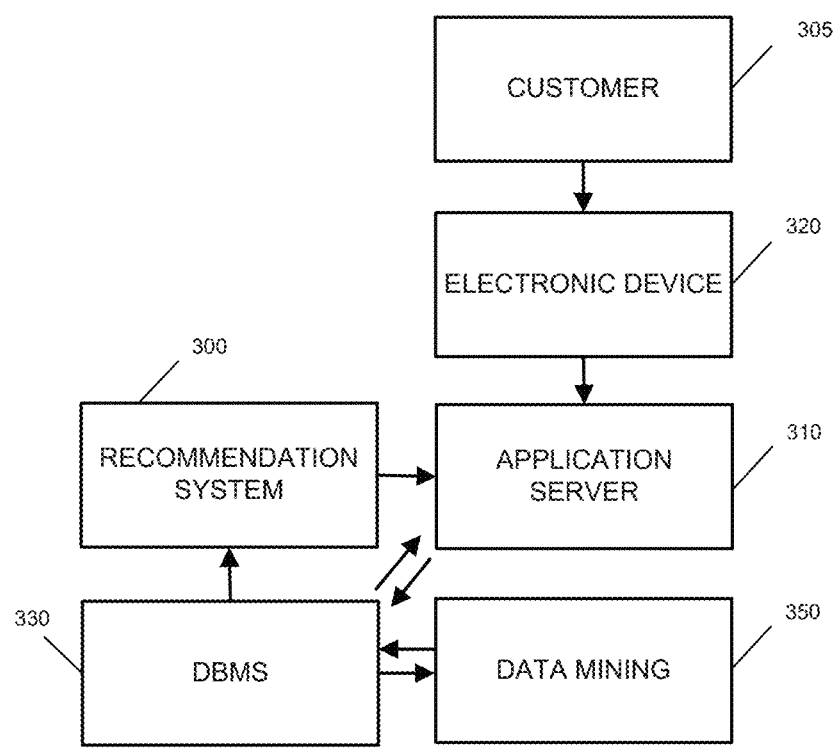
FIG. 6 is a diagram of the main components of the wine recommendation system of the present invention.

Turning to FIG. 6, a recommendation system 300 that sells and recommends wine online to consumers is shown. Customer 305 may connect to an application server 310 via an electronic device 320 (computer, tablet, mobile phone, etc.) to browse wine and to place an order online. The electronic device 320 generally includes a processor, input/output (I/O) interfaces, a data storage, and memory. The application server 310 may be a digital computer that includes a processor, input/output (I/O) interfaces, a network interface, a data storage, and memory. The electronic device 320 and application server 310 may communicate by wired or wireless communications as known to those of ordinary skill in the art based on this disclosure. The application server 310 records all of the behaviors of the customer (input of customers include consumer profile data, order information, comments and ratings on wines, and click stream of the consumer) to a database management system (DBMS) 330, which has pre-populated wine profile data. The data mining process 350 may include software to analyze all of this data and extract structured and useful information (consumer preference profile data) and save the data back into the DBMS 330. The recommendation system 300 and data mining software 350 may be part of the application server 310 or may be located remotely on different computers and accessed via API's or the like. The recommendation system 300 may calculate the likelihood a customer will like a product, rank the products according to the likelihood, and communicate the results to the application server 310 so that the application server 310 will display the top results to the customer 305 via electronic device 310.

Figure 7:
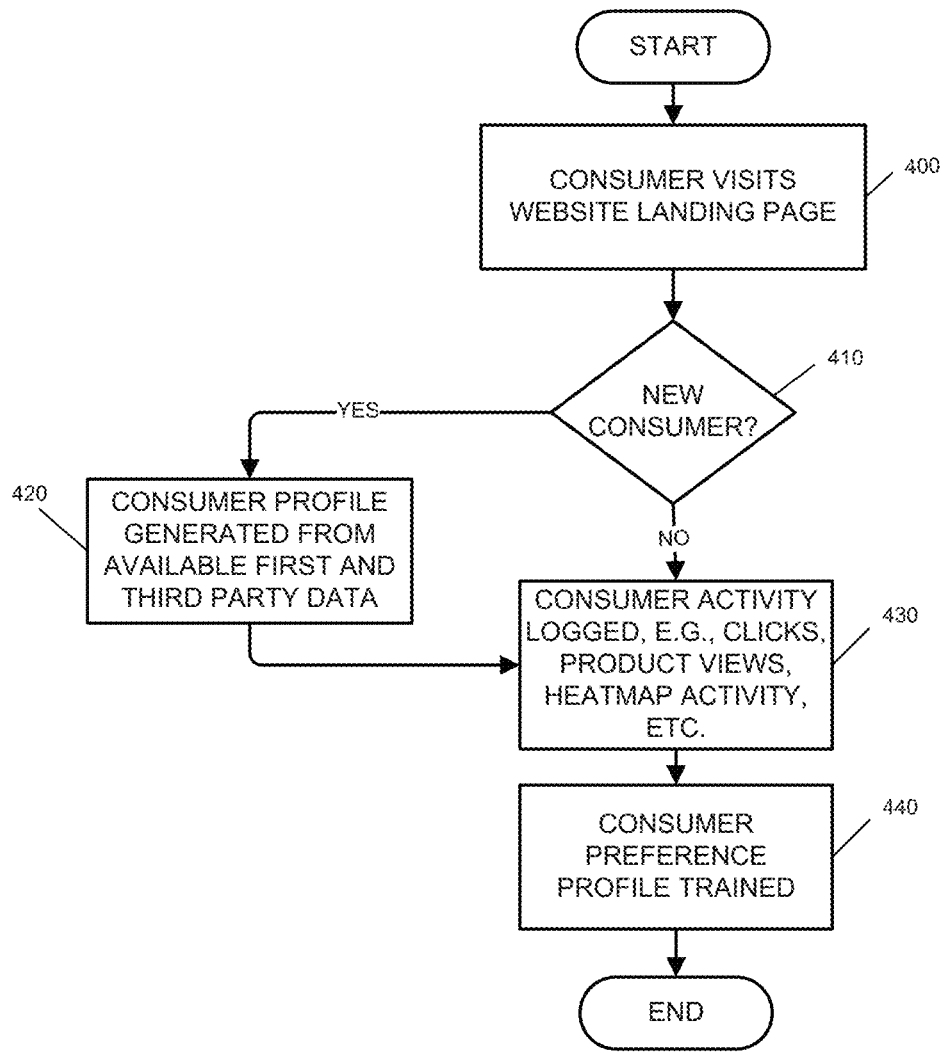
FIG. 7 is a flow chart showing the process for obtaining a consumer preference profile from a website visitor.

Turning to FIG. 7, in a website visit feedback loop, in step 400 the customer visits a website such as a landing page. In step 410, the system determines whether the consumer is a new consumer or an existing consumer. If the consumer is a new consumer, a consumer profile is generated from available first and third party data in step 420, and then the system proceeds to step 430. If the consumer is an existing customer, then it goes directly to step 430 where the consumer activity is logged (e.g., clicks, product views, heatmap activity, etc.). Next in step 440, a consumer preference profile is trained as discussed above in connection with FIGS. 4 and 5.

Figure 8:
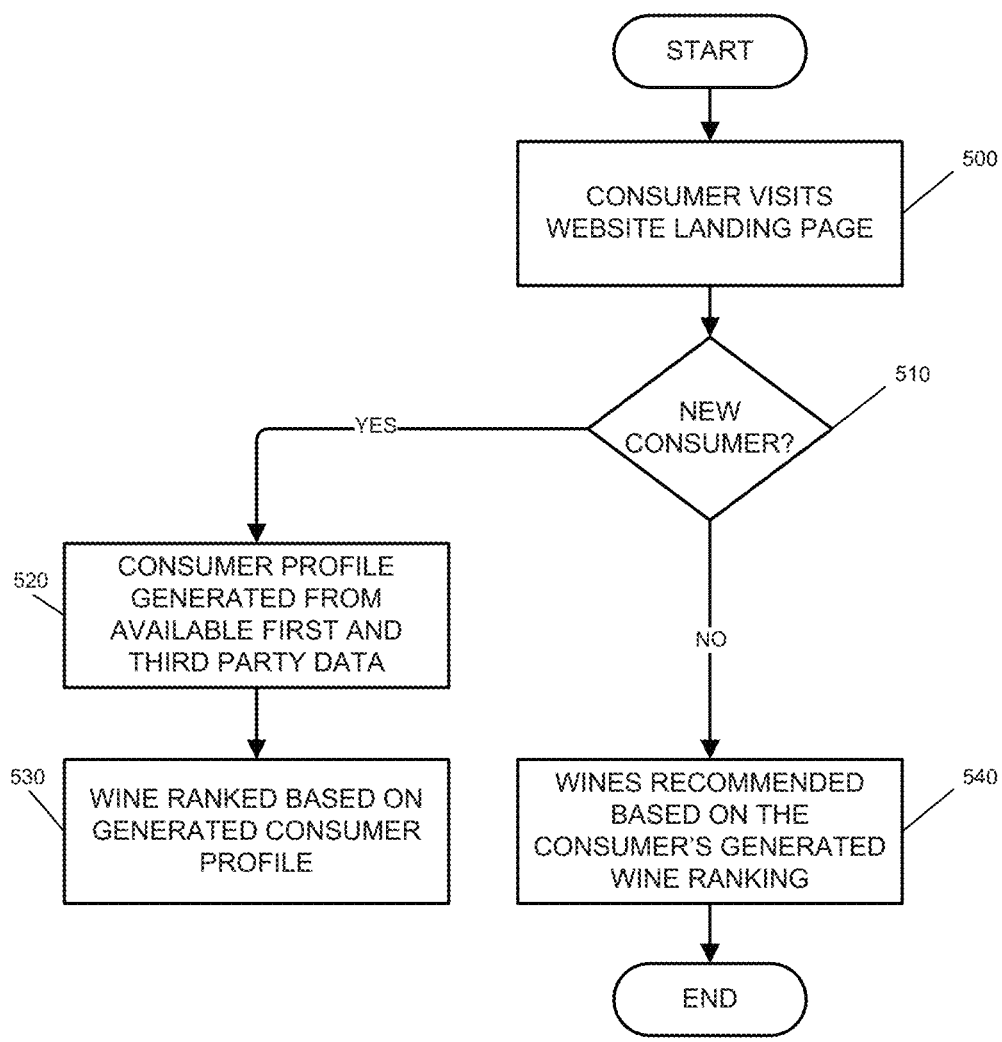
FIG. 8 is a flow chart showing the process for generating wine recommendations for a website visitor.

In FIG. 8, a flow chart shows the steps for a recommendation engine associated with a website. In step 500, a consumer visits the website landing page. In step 510, the system determines if the consumer is a new consumer or an existing consumer. If the consumer is a new consumer, a consumer profile is generated from available first and third party data in step 520. Next, in step 530 wines are ranked based on the consumer profile generated in step 520. In step 540, wines are recommended based on the consumer's generated wine ranking. If the consumer is an existing consumer as determined in step 510 then the system proceeds directly to step 540.

Figure 9:
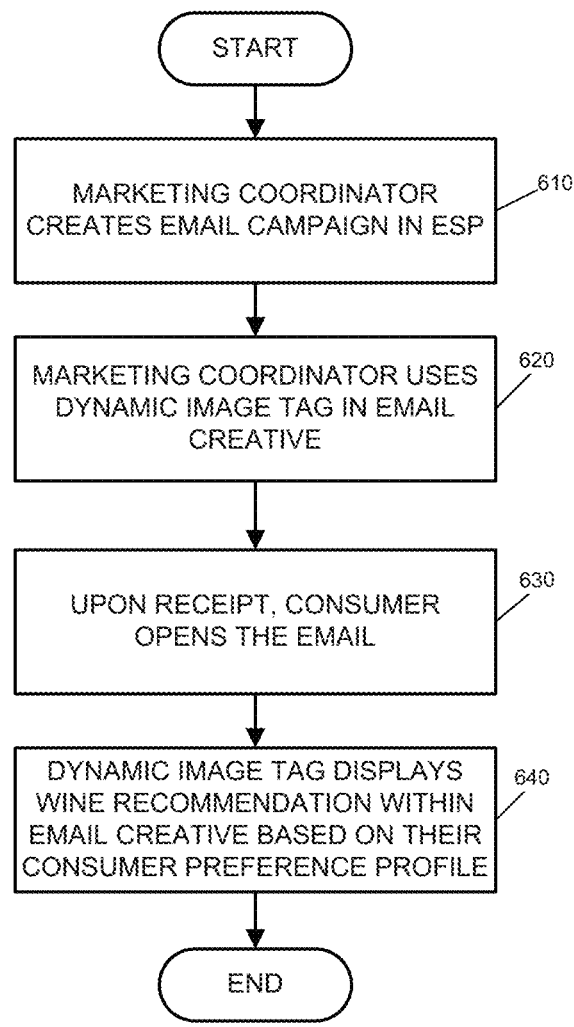
FIG. 9 is a flow chart showing the process for an e-mail marketing campaign recommendation engine.

In FIG. 9, the steps of an e-mail marketing campaign recommendation engine are shown. In step 610, a marketing coordinator creates an e-mail campaign through an e-mail service provider (ESP). In step 620, the marketing coordinator uses a dynamic image tag in an e-mail creative work. In step 630 upon receipt the consumer opens the e-mail. In step 640, the dynamic image tag displays a wine recommendation within the e-mail creative work based on the individual consumer preference profile of the consumer.

Figure 10:
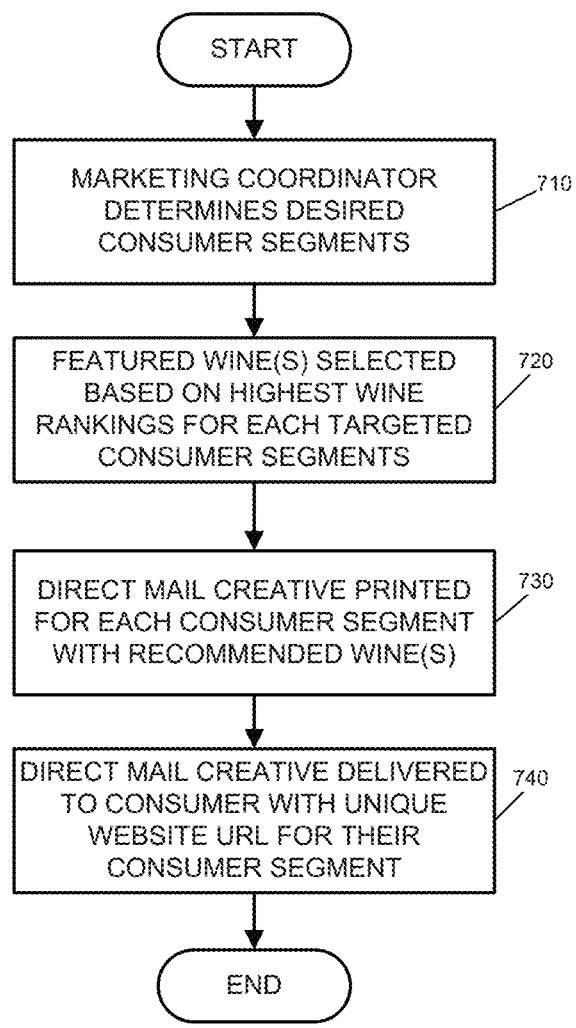
FIG. 10 is a block diagram showing the steps of a direct marketing campaign recommendation engine.

Turning to FIG. 10, the steps of a direct mail marketing campaign recommendation engine are shown. In step 710, a marketing coordinator determines desired consumer segments. In step 720, feature wine(s) are selected based on the highest wine rankings for each targeted consumer segment. In step 730, a direct mail creative including recommended wine(s) is printed for each consumer segment. Next, in step 740 the direct mail creative is delivered to a consumer with a unique website URL for their consumer segment. What is also contemplated is a one-to-one pairing of marketing to users. Consumers are identified and given an ID and this ID serves alongside a dynamically generated link of a page created specifically for the user.

Each customer may be represented by a vector consisting of a number of descriptors. A cluster of similar customers can then be identified using distance-based clustering algorithms where the distances (similarity) among customers are first calculated, and then similar customers are grouped into clusters with certain standards. For example cosine similarity can be used to calculate such distance:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}}$$

In the above example, a similarity score of 1 representing the two vectors are identical, whereas −1 represents that they are completely opposite. The distance of the two vectors can be defined as d=1−similarity. After that, clustering algorithms like K-means, DBSCAN, hierarchical clustering, etc. may be applied to obtain clusters of similar customers.

There is no specific restriction on the particular distance metrics and clustering algorithms that can be utilized. Different algorithms may be applied in different scenarios based on their performance and effectiveness.

A number of various recommendation algorithms may be applied in order to select the wine with the highest probability of a customer liking it. One straightforward approach is to calculate the similarity of a customer's preference to each wine in the DBMS, and rank the similarity scores in descending order. Other algorithms may not use customer preferences directly, but rather could use a matrix as shown in FIG. 11. The numbers in the matrix of FIG. 11 represent the total number of times a particular customer has purchased a bottle of wine. For example, Customer A has purchased Wine 1 a total of five times, Wine 2 a total of three times, Wine 4 a total of one time, and they have never purchased Wine 3 or Wine 5. Turning to FIG. 12, a method such as matrix factorization or maximum likelihood may be used to fill the missing values in the matrix of FIG. 11. The largest numbers in each row in FIG. 12 imply the estimated likelihood that a customer will buy the wine. For example, Wine 2 should be recommended to Customer B, and Wine 3 should be recommended to Customer D. Each column in FIG. 12 may be replaced with specific descriptors, which could then be used to obtain a customer's particular preference. In the event that the matrix is too sparse (i.e., not enough order history available), the rows may also be represented by a cluster of customers instead of individual customers.

In one aspect of the invention, consumers may be categorized based on various points of data (demographic, psychographic, behavioral, etc.) into purchasing cohorts. A "shelf" of wines with labels/names/logos (a labeling cohort) having a higher probability of leading that purchasing cohort to make a purchase (as opposed to other labeling cohorts) is displayed to the consumer.

In another aspect, when a consumer arrives at the website or is targeted by a banner advertisement or the like on a third party website where the consumer's information is already known (e.g., YAHOO! or GMAIL) and directed to the website, the consumer is immediately bucketed by the system into a customer segment (e.g., Segment 4). Segment 4 is known by the system to be more receptive (meaning higher purchase intent) to wine labels that include abstract art, geometric shapes, and bold colors. Those three criteria (abstract art, geometric shapes, and bold colors) may comprise Segment BB of a visual attribute model. Accordingly, a bottle of wine or a "shelf" of wine with a label or labels from the Segment BB inventory is displayed to the Segment 4 consumer to increase the chances of a purchase being made.

The invention provides a wine label affinity system as a computer-implemented software system 50, comprising of a network of personal computers 24, 25 each containing at least a processor 36, a memory 37, and a display 39 connected to the processor 36 along with a wine buyer interface 40 connected to the computer processor 36. In this embodiment, the processor 36 is capable of executing HTML code or an email software interface and the system is further constrained with a network enabled server 22 connected to a server processor 32 with a server memory 33. The affinity system is connected to the wine buyer software interface 40 and includes a database module 330 for entering and storing inputs linked with certain wine characteristics, such as, the label of the wine; a profile module for creating a user profile for at least one potential buyer of wine by either an entry of data from the buyer or a crawler system for securing relevant data points from the memory of a buyer's computer 24, 25.

In addition, the affinity system also includes an algorithm module 1004 for generating a list of potential wines of interest ranked on likelihood of purchase 1005 based on the user profile 1001, 1002 and/or the entry of relevant data points linked to wine characteristics 1003; a module for generating a personalized group of product listings in a personalized communication email 1006 or page 1007 where the list of potential wines of interest are ranked and displayed according to their likelihood of purchase; a module for order placement by the buyer after having received the personalized communication email 1006 or page 1007; a module 100 for analyzing extracting wine descriptors 110 from customer activities and then converting these descriptors to consumer preferences 120, and storing the preferences back into the database alongside other fields in the database 130.

In a different embodiment of the invention, the wine label affinity system includes the at least one of the fields related to the label of the wine selected from a list consisting of a castle, an animal, a primary label color, a secondary label color, a type of closure, a country of origin, or a varietal; a module for generating a personalized group of product listings in a personalized communication email 1006 or page 1007; ranking the list of potential wines of interest and displaying such list with an illustration of a full bottle with the highest ranked label with the greatest likelihood of purchase in the center of the image next to other labels 1500.

The invention also provides a method of use of a wine label affinity system as a computer-implemented software system. The method includes performing data mining with at least one network enabled server 22 for executing a wine label affinity system; storing in a database using a first module, inputs linked with each of a plurality of wines on the server memory, wherein at least one of the fields is related to the label of the wine; allowing a plurality of wine buyers, each having a computer processor 36 with a memory 37 for executing at least a software in the memory 37 by the processor 36, a computer display 39 connected to the processor 36, a wine buyer interface 40 connected to the computer processor 36 and a network 21.

In this embodiment, each computer processor 36 can execute an HTML or email software interface and connects to the server 22, thereby enabling the affinity system to connect the wine buyer interface 40 (for each of the plurality of personal computers 24, 25) to the server 22. The method is further constrained by a second module for creating a user profile for at least one potential buyer of wine, wherein the module includes either an entry of data from the potential buyer or a crawler system for securing relevant data points from the computer memory of the personal computer of the potential buyer 24, 25. An algorithm module 1004 is then executed for the user profile 1001, 1002 thereby generating a list of potential wines of interest ranked based on a likelihood of purchase 1005 based on wine characteristics 1003. The algorithm 1004 also generates a third module consisting of a personalized group of product listings 1008 in a personalized communication email 1006 or page 1007 where each of the list of potential wines of interest are ranked and displayed according to the likelihood of purchase 1005, 1500.

The method is further constrained by system comprising a module for the placement of an order to purchase wine by the potential buyer of wine after having received at the personal computer of the wine buyer 24, 25 a personalized communication email 1006 or page 1007, containing a first module including an analyzer for customer activity which extracts wine descriptors 110 from customer activities, then converts these descriptors to consumer preferences 120, and final stores the preferences back into the database alongside other fields in the database 130.

In another embodiment, the method includes the steps of initial landing by a wine buyer on a webpage 400; determine if the wine buyer is a new consumer 410; the steps of execution of the algorithm module 1004 using entry of data that the consumer is new 410 and if the consumer is recurring then using relevant data points from previous actions by the wine buyer 430; generating a list of potential wines of interest ranked based on a likelihood of purchase 540, 1005, based on the at least one of the fields related to the label of the wine. The method also can include the additional steps of a marketing coordinator creating an email campaign 610; using dynamic image tag in email 620; and once received by the wine buyer 630 displaying the recommended images locally based on the buyer preferences 640. Finally, the method can include the marketing coordinator further determining the desired segment of consumers 710 before creating the email campaign, selecting featured wines based on the likelihood of purchase by the wine buyer 720, and directing an email to be printed 730 or published in a display by the wine buyer 740.

Recent eye-tracking technology allows for a light sensor, mounted next to a camera on a cell phone, a computer, or other device to send light or use ambient photons to determine via extrapolation and other methods of calculation the angle of the retina and thus the angle of the eye. Using this angle and the distance between the sensor and the eye, the technology can tract the precise location on a screen where a user sets his or her eyes. With enough precision, a location the size of a finger on a screen can be determined. This technology was first used to help disabled individuals use keyboards or the internet. As this technology becomes widespread and available to marketers, it will be implemented alongside with this technology very easily as an additional data point of entry. Quickly, when 10 wine labels are shown to a person, there will no longer be the need to even query the user as to which label fancies the person. It can reasonably be assumed that a user will focus the eyes, after a period of transition, to the label which is preferred. By offering to the user multiple sets of bottles, a list of preferred labels would be able to be extrapolated.

The same way this technology ranks different labels as explained above and can produce an email with multiple ranked images in a very precise fashion, the generation of sets of images for review by a user to optimize the eye-tracking technology is performed the same way. Using the eye-tracking technology, a set of normally 20 images would have to be generated to determine 20 data points of interest (i.e. the 20 favorite labels). By iteratively using the technology to generate the sets, instead of securing 20 data points, only 10 or fewer grids would be needed to get the same level of information as the grids produced would already have information.

In addition to eye-tracking information technology use, what is contemplated is the use of touch features on computers, pads, and cell phones to enhance selection and use of the system. For example, in the dating area a left-right swiping system allows users to quickly provide data entry of favorite selections into a system. Using the same technology, one an email is sent with arranged bottles using the above technology, a user can be asked to swipe or touch portions of the screen of greater interest. For example, the bottles using this technology can be aligned from front to back and a user can simply swipe aside bottle designs is likes and those it does not as part of an interface part of a module. This system will help enter into a first module to enter into a database a plurality of input resulting from the swipe action relating to the label of the wine. In some embodiment, the second module can be used to help generate a user profile of a specific user of a device and not generally for the device as a whole.

Finally, what is contemplated is the generation of customized wine labels based off the preferences and selections generated by the system. In one embodiment (not shown), the system instead of simply sending marketing information instead generates labels (new or existing) which are placed on products packaged and offered for sale to the user. For example, single wine labels can be selected or sets of labels can be generated using the system and method of use thereof to generate a "case" of wine for purchase as part of a regular monthly club case.

Figure 16:
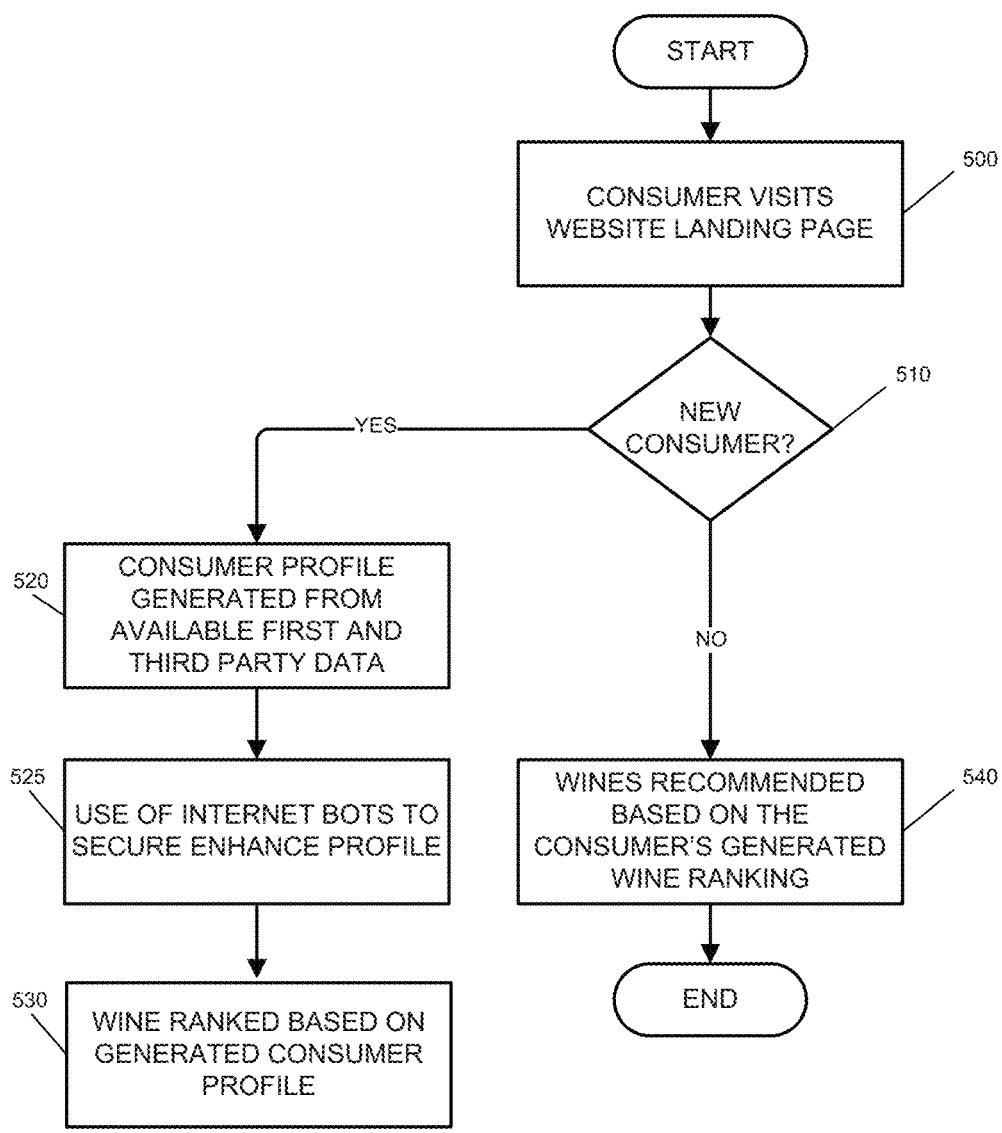
FIG. 16 illustrate a block diagram showing the further step of using bots to enhance the determination of a user profile according to an embodiment of the present disclosure.
Figure 17:
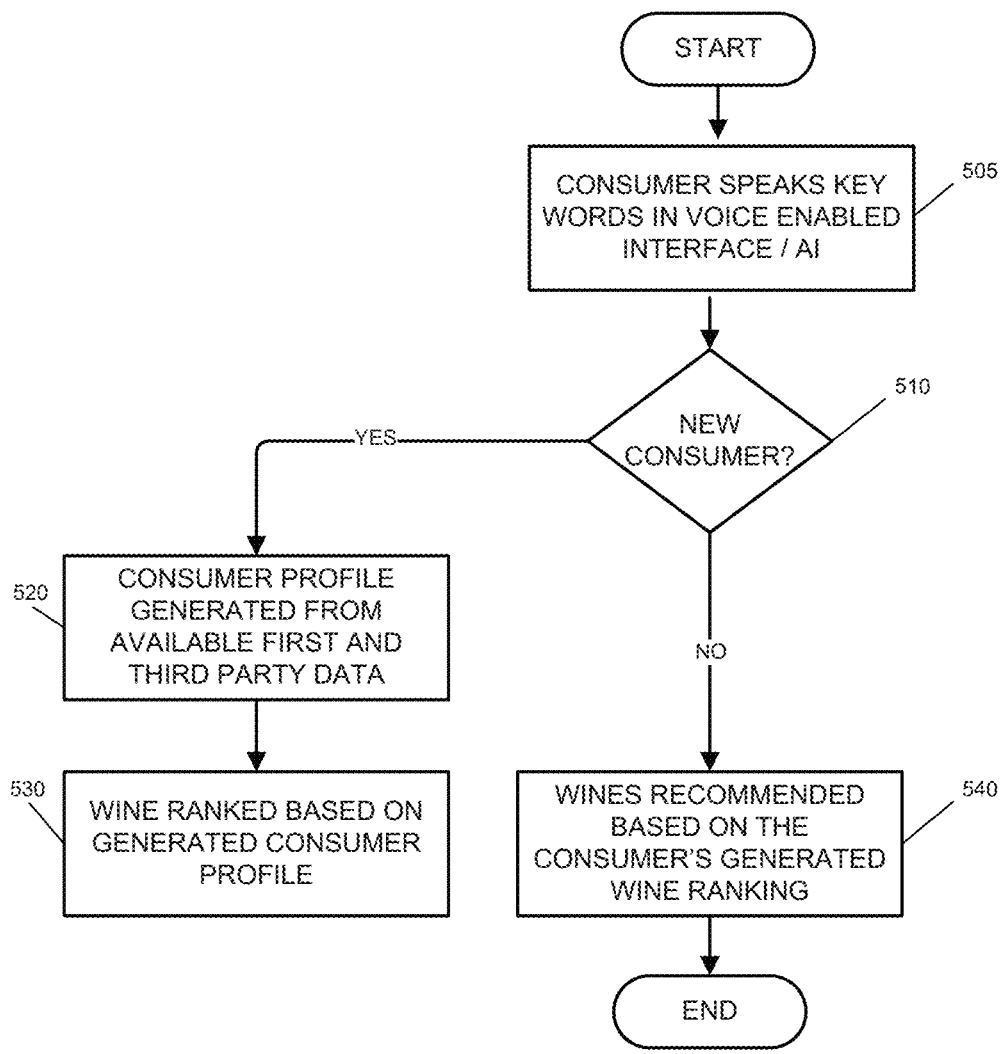
FIG. 17 illustrates the block diagram of FIG. 8 but illustrates how an artificial intelligence assisted surfing can be used with the technology according to an embodiment of the present disclosure.

In one embodiment, the use of software applications that run automated tasks or scripts called commonly "bots" can be used to reinforce the above described technology in many ways. Bots are used to automate a repetitive online interaction and mimic human behavior and conversation and can include visual components. Bots can manipulate ratings, reviews, or other elements. In one embodiment, bots can be used to rapidly crawl the internet, secured additional information about the purchasing elements in an area around the potential buyer and further enhance the algorithm. As shown at FIG. 16, in addition to a new 510 consumer profile 520 being generated from available first and third party data, it is contemplated that bots 525 be used to enhance the profile before wines are ranked 530.

In an effort of further clarification, while computerized systems are used to generate customized email blasts to different customers, the system also is used in tandem with other methods of marketing like direct mail mailing or any other outlet to help customize marketing products. For example, a user may have 12 featured wines on a given month to sell. By using this system, in addition to sending users and potential clients targeted and customized emails and other communications featuring what can be considered the preferred wine most likely to be purchased based on the algorithm, there may be a narrowing of the entire paper mailing into 12 segments (one for each product) and the printing of twelve different paper mailings to be sent to the respective users from each of these 12 segments.

In also to further explain the above technology, the use of what is called "cookies" which are small files stored on a user's computer designed to hold data of multiple different types. What is contemplated is the use of a private and specific cookie to be able to monitor precisely the information relating to the field of the invention but also to browse and upload cooking-related information for other third party cookies. For example, a login cookie can be used and programmed to guide the collection of information.

Alongside the use of bots as described above, what is contemplated is the use of this technology, as described in association with users bypassing normal interfaces and digital displays and relying on voice-commanded tools, or other visual and audio interfaces to enter key works. The same way a user may reach a search engine like Google®, the same user can hold a button on the iPhone® and enable the Siri™ voice recognition system. This system transforms voice into text, will type the command "please search for wine" and the same search will be conducted in the same search engine but by the voice interface. Instead of returning links or websites as the search, Siri™ also has algorithms to memorize user profiles to optimize returns.

In yet another embodiment, other channels of marketing and distribution can be used to send targeted communications to improve sales to users. For example, different groups and segments already agglomerate online at different websites, blogs, or social media. These groups are given common attributes by the technology which in turn further enhances the user profile upon initial contact.

Finally, ordinal attributes to quantify bottles and labels from a range of 0 to 1, 1 to 10, or any other scale can include more complex notions than simply actual attributes like shape or color. The same way wine is generally described in terms of adjectives and nouns, a possible list for example can include: mythical, abstract, quirky, artistic, elegant, joyful, playful, simple, prestigious, authentic, mysterious, dark, radical, subdued, sinister, seductive, sinful, luxurious, bold, spiritual, controversial, relaxing, refreshing, aspirational, friendly, modern, intriguing, funny, dramatic, ethnic, adventurous, and clever. For example, these different words/notions/attributes can in turn be used to better mine non-proprietary cookies found on a user's computer. For example, if a user has surfed other website with the "ethnic" nature, it can be extrapolated that this user might prefer a wine label which associates with this quality.

The present invention contemplates that many changes and modifications may be made. Therefore, while the presently-preferred form of the wine recommendation and wine label affinity system has been shown and described, and several modifications and alternatives discussed, persons skilled in this art will readily appreciate that various additional changes and modifications may be made without departing from the spirit of the invention, as defined and differentiated by the following claims.

The invention claimed is:

1. A wine label affinity system comprising:
a plurality of personal computers each with at least a computer processor with a computer memory, a computer display connected to the computer processor, and a frontal camera connected to the computer processor; and
at least one network enabled server comprising a server processor with a server memory, the server processor being configured to:
  instruct a first personal computer of the plurality of personal computers associated with a first user accessing the server processor to render an interface comprising images of a plurality of wine labels;
  instruct the first personal computer to capture image data of the first user viewing the rendered interface using the first personal computer's associated frontal camera;
  receive the captured image data of the first user from the first personal computer;
  analyze the received captured image data and track, based on the analysis, a region of the interface on which the first user's eyes are focused;
  determine, after a transition period elapses, whether the first user's eyes focused on a region mapping to one of the wine labels;
  crawl the computer memory of the first personal computer to obtain preference data associated with the first user;
  assign a first multi-dimensional profile vector to the first user accessing the server processor based at least in part on (i) an affirmative determination that the first user's eyes focused on a region mapping to one of the wine labels and (ii) the obtained preference data;
  access a database storing both a unique second multi-dimensional profile vector and a unique second multi-dimensional preference vector for each of a plurality of second users;
  score a profile similarity between the first multi-dimensional profile vector and each of the plurality of second multi-dimensional profile vectors as a trigonometric function of an angle defined between the first multi-dimensional profile vector and each respective second multi-dimensional profile vector such that the respective profile similarity between the first multi-dimensional profile vector and the respective multi-dimensional second profile vector is a scalar existing in a range of [−1 to 1] and the quantity of scored profile similarities is equal to the quantity of second multi-dimensional profile vectors;
  calculate a profile distance between the first multi-dimensional profile vector and each of the plurality of second multi-dimensional profile vectors by summing one and an inverse of each respective similarity scalar such that each of the profile distances (d) is a scalar defined as distance equal to 1 minus the similarity existing in a range of [−1 to 1] (d=1−similarity);
  identify a subset of the plurality of second users based on the calculated profile distances;
  determine an averaged preference vector by averaging together the second multi-dimensional preference vectors assigned to the identified subset of second users;
  access a database storing respective multi-dimensional product vectors including inputs linked with certain wine label features for each of a plurality of wines;
  score a preference similarity between the averaged preference vector and each of the plurality of multi-dimensional product vectors as a trigonometric function of an angle defined between the averaged preference vector and the respective multi-dimensional product vector;
  rank the preference similarity scores and select a subset of the plurality of wines based thereon;
  generate a personalized email message with a personalized wine recommendation listing and comprising a dynamic image tag configured to, upon opening of the personalized email message, cause a computer processor to retrieve and present on an interface images of each wine in the selected subset of wines; and
  send the generated personalized email message to the first personal computer.

* * * * *